Oct. 16, 1928.

T. F. FERRY 1,688,180

VEHICLE SPRING SHACKLE

Filed Oct. 17, 1923

Inventor
Thomas F. Ferry

By
Ocel E. Billman Attorney

Patented Oct. 16, 1928.

1,688,180

UNITED STATES PATENT OFFICE.

THOMAS F. FERRY, OF CLEVELAND, OHIO.

VEHICLE-SPRING SHACKLE.

Application filed October 17, 1923. Serial No. 668,976.

My invention relates to improvements in vehicle spring shackles used in connecting the eye formed ends of vehicle chassis and spring members, the improved shackle being particularly designed and adapted to automatically take up wear and prevent looseness between the edges of the eye formed portions of vehicle chassis and spring members, or the hangers for the latter, and consequently preventing any noise or rattle between adjacent parts.

The primary object of the invention is to provide a generally improved vehicle spring shackle of the type or class indicated, which will be exceedingly simple in construction, cheap of manufacture, and efficient in use.

A further and very important object is the provision of an improved shackle adjusting and fastening device which may be readily attached to or detached from the threaded end of an ordinary shackle bolt without the removal of the latter and consequently without in any way disturbing or disconnecting the adjacent parts.

A further and important object is the provision of an improved shackle bolt adjusting and fastening device comprising an improved nut adapted to be used in lieu of the ordinary nut on such shackle bolt, together with a compression device surrounding said nut and controlled and asembled by the latter and excluding dust from the adjacent threaded and other portions.

With the above mentioned and other ends in view, the invention consists in the novel construction, arrangement, and combination of parts, hereinafter described, illustrated in one of its embodiments in the accompanying drawings, and particularly pointed out in the appended claims.

Figure 1:
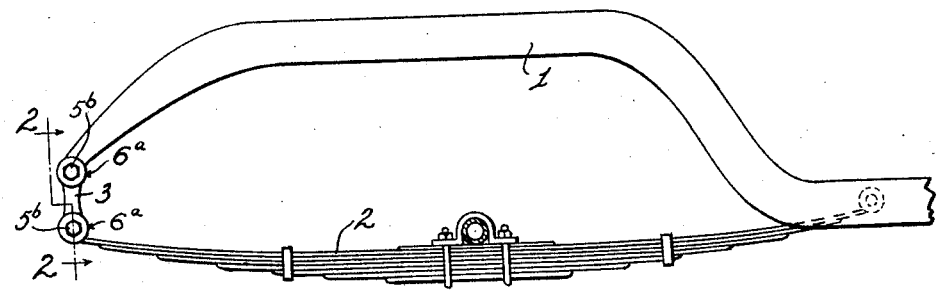

Referring to the drawings forming a part of this specification, Figure 1 is a side elevation of a vehicle chassis side bar and spring member embodying a shackle connection arranged and constructed in accordance with this invention.

Figure 2:
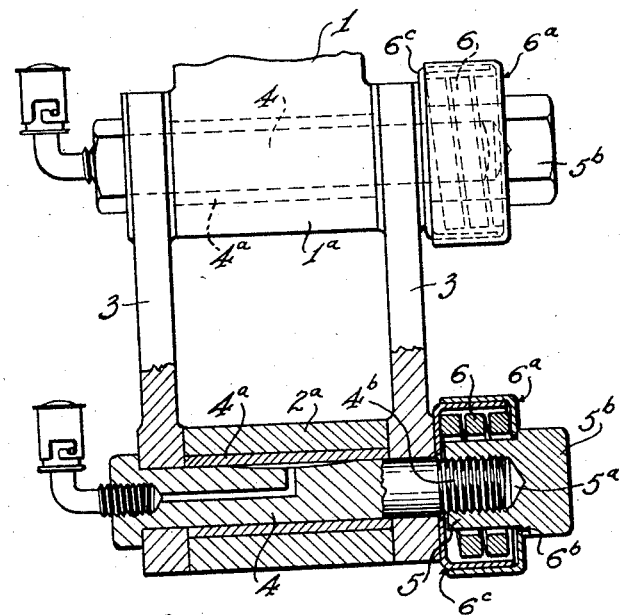

Fig. 2, an enlarged view of the improved spring shackle, partly in elevation and partly in section, taken on line 2—2 of Fig. 1.

Similar numerals of reference designate like parts throughout all the figures of the drawings.

The vehicle chassis frame member 1, and the vehicle spring member 2, may be of any suitable and convenient construction and relative arrangement, and forming no specific part of the present invention, the same need not be described in detail.

For the purpose of illustration I have shown my improved shackle in connection with the eye formed or loop end $1^a$, of a curved or off-set end of a chassis side bar, and the eye or loop $2^a$, of a spring of the leaf type.

The shackle links 3 and shackle bolts 4 may likewise be of any suitable and convenient form or type. In the present instance, I have shown the bolts 4 with suitable lubricant carrying and feeding ports and provided with the usual tubular bushings $4^a$.

The shackle bolts 4 are provided with threaded ends $4^b$, projecting from one side of one of the shackle links 3, as shown.

Referring now to the improved shackle link and bolt adjusting and tensioning device to which this invention particularly relates, it will be seen that I provide a special form of nut of the type generally known as "blind" nuts, for use in lieu of the ordinary nut now commonly employed. The nut is provided on its inner or under side with a threaded opening or bore $5^a$, in the cylindrical section 5, adapted to surround and protect the threaded end $4^b$ of the bolt, said cylindrical section 5 terminating at its outer end in an enlarged adjusting head $5^b$, of any suitable convenient angular form or type to receive and be moved by a suitable wrench.

As a means of resiliency and frictionally clamping the eye or loop ends $1^a$ and $2^a$ of the connected vehicle and spring members between the shackle links 3 to take up wear and prevent rattle between the connected parts, the nut 5 is provided with a suitable compression device interposed between one of the shackle links 3 and a suitable portion of the nut 5 so that the same may be actuated and controlled by the latter. As a convenient means of assembling the parts through the medium of the nut 5, as well as excluding dust from the adjacent or threaded parts, the compression device preferably comprises a coiled or helical spring 6, surrounding the threaded section 5, and as a convenient means of compressing the spring 6, as well as covering and protecting the latter, the compression device is preferably provided with a compression member $6^a$. In the present instance, the compression member $6^a$ is in the specific form of a cylindrical dust excluding cup having an opening adapted to receive the cylindrical portion 5 of the nut and to be engaged by the adjusting head $5^b$ of the nut, the enlarged head $5^b$, in the present instance, being provided with a shoulder $6^b$. As a convenient means of forming a dust excluding housing, a second cup $6^c$, is preferably provided to form a seat for the helical spring 6, said cup members $6^a$ and $6^c$ having their rim portions overlapping each other in telescoping relation to permit of the requisite movement of the parts as the compression device is adjusted by the adjusting head $5^b$.

By reason of the above construction, it will be seen that improved means are provided for adjusting the shackle bolts and links against the tension of the resilient compression device so that by turning the nut in one direction or the other the friction or tension between the shackle links and the edges of the eyes or loop ends $1^a$ and $2^a$ of the chassis frame and spring members 1 and 2, respectively, may be increased or decreased as desired. It will be seen also that the compression and dust excluding members are so mounted and arranged with respect to the shackle link and bolt members that the same may be assembled and controlled by the improved shackle bolt and adjusting and fastening nut and the dust excluded from the adjacent bearing and threaded portions thereof.

It will be seen also that the friction or clamping action of the shackle links against the edges of the eyes $1^a$ and $2^a$ causes the ends of the members 1 and 2 to be frictionally bound or checked between the shackle links 3, so that the latter in a measure act as a shock absorber.

Having thus described one of the embodiments of my invention, without having attempted to set forth all the forms in which it may be made, or all the modes of its use, what I claim and desire to secure by Letters Patent is,—

1. The combination with a spring shackle mechanism, comprising a frame and spring members terminating in eyes, shackle links, bolts connecting the links, said bolts having a threaded end portion extending through the links a sufficient distance to receive a nut, of a shackle unit for such mechanism, including a nut having a threaded bore to engage the threaded portion of said bolt, and a shouldered head portion, a spring disposed between the shouldered head and the shackle link and telescoping cups enclosing said spring, one of said cups being adapted to be engaged by said shouldered head portion of the nut, whereby the spring will be compressed upon tightening of the nut.

2. A shackle unit for attachment to spring shackles comprising a nut having a shouldered head and a body section having a threaded bore, a helical spring to surround the body section, and a casing for the spring comprising a pair of oppositely disposed cup shaped members adapted to telescope together, said members forming seats for the compression spring, one of said members engaging the shouldered portions of the nut, whereby tightening of the nut forces the telescoping cups together and compresses the spring.

3. A shackle unit for attachment to spring shackles comprising a nut having a shouldered head and a body section having a threaded bore, a helical spring to surround the body section, and a casing for the spring comprising a pair of oppositely disposed interfitting casing members adapted to telescope together, said members forming seats for the compression spring, one of said members engaging the shouldered portions of the nut, whereby tightening of the nut forces the telescoping members together and compresses the spring.

In testimony whereof I have affixed my signature.

THOMAS F. FERRY.